United States Patent [19]

Stolpp

[11] Patent Number: 4,516,894
[45] Date of Patent: May 14, 1985

[54] LOAD PRESSURE FEEDBACK SYSTEM HAVING AT LEAST ONE CONTROL VALVE FOR CONTROLLING AN APPARATUS

[75] Inventor: Siegfried Stolpp, Niederfischbach, Fed. Rep. of Germany

[73] Assignee: ALB Klein GmbH & Co. KG, Niederfischbach, Fed. Rep. of Germany

[21] Appl. No.: 355,585

[22] PCT Filed: Jun. 27, 1981

[86] PCT No.: PCT/DE81/00099
§ 371 Date: Feb. 22, 1982
§ 102(e) Date: Feb. 22, 1982

[87] PCT Pub. No.: WO82/00112
PCT Pub. Date: Jan. 21, 1982

[30] Foreign Application Priority Data

Jun. 28, 1980 [DE] Fed. Rep. of Germany ....... 3024402

[51] Int. Cl.³ .......................... B25J 3/04; F15B 13/14
[52] U.S. Cl. .......................................... 414/5; 901/9; 901/22
[58] Field of Search ............... 414/5, 6, 1; 91/363 A, 91/217, 445, 515; 901/9, 22

[56] References Cited

U.S. PATENT DOCUMENTS

| 3,123,230 | 3/1964 | Oppenheimer . | |
|---|---|---|---|
| 3,168,203 | 2/1965 | Gallistel | 414/5 |
| 3,241,687 | 3/1966 | Orloff . | |
| 3,422,965 | 1/1969 | Lloyd | 414/5 |
| 3,608,743 | 9/1971 | Mosher et al. | 414/5 |
| 3,618,786 | 11/1971 | Fick | 414/5 |
| 3,637,092 | 1/1972 | George . | |
| 3,698,580 | 10/1972 | Carlson et al. | 414/5 |
| 3,712,180 | 1/1973 | Pieper . | |
| 3,880,304 | 4/1975 | Strickland, Jr. | 414/5 X |

FOREIGN PATENT DOCUMENTS

| 1082718 | 6/1960 | Fed. Rep. of Germany . |
| 2107676 | 9/1971 | Fed. Rep. of Germany . |
| 7139508 | 6/1973 | France . |
| 7610644 | 11/1977 | France . |
| 1106472 | 7/1965 | United Kingdom . |

Primary Examiner—Leslie J. Paperner
Assistant Examiner—Terrance L. Siemens
Attorney, Agent, or Firm—Roberts, Spiecens & Cohen

[57] ABSTRACT

A load pressure feedback system having at least one control valve for controlling a manipulator comprising a load arm which is pivotally connected to a base member, and a control member having a manually movable control arm which is of the same configuration as but on a smaller scale than the load arm. The pivots or rotary mountings of the load arm and control arm are connected together and controlled by a load pressure feedback system comprising a valve having a hydraulic pilot control member. The load pressures at measuring locations of the apparatus are applied to the inlet of at least one throttle aperture and the level of the control pressures is determined by the cross-sectional areas of the throttle aperture and a screw-in control aperture in the valve. At least one control piston is subjected, on the one hand, to the load pressures and on the other hand to the control pressures. The hydraulic load pressure control valve has control edges and apertures and the ratio of the aperture cross-sectional areas determines the control pressures.

10 Claims, 7 Drawing Figures

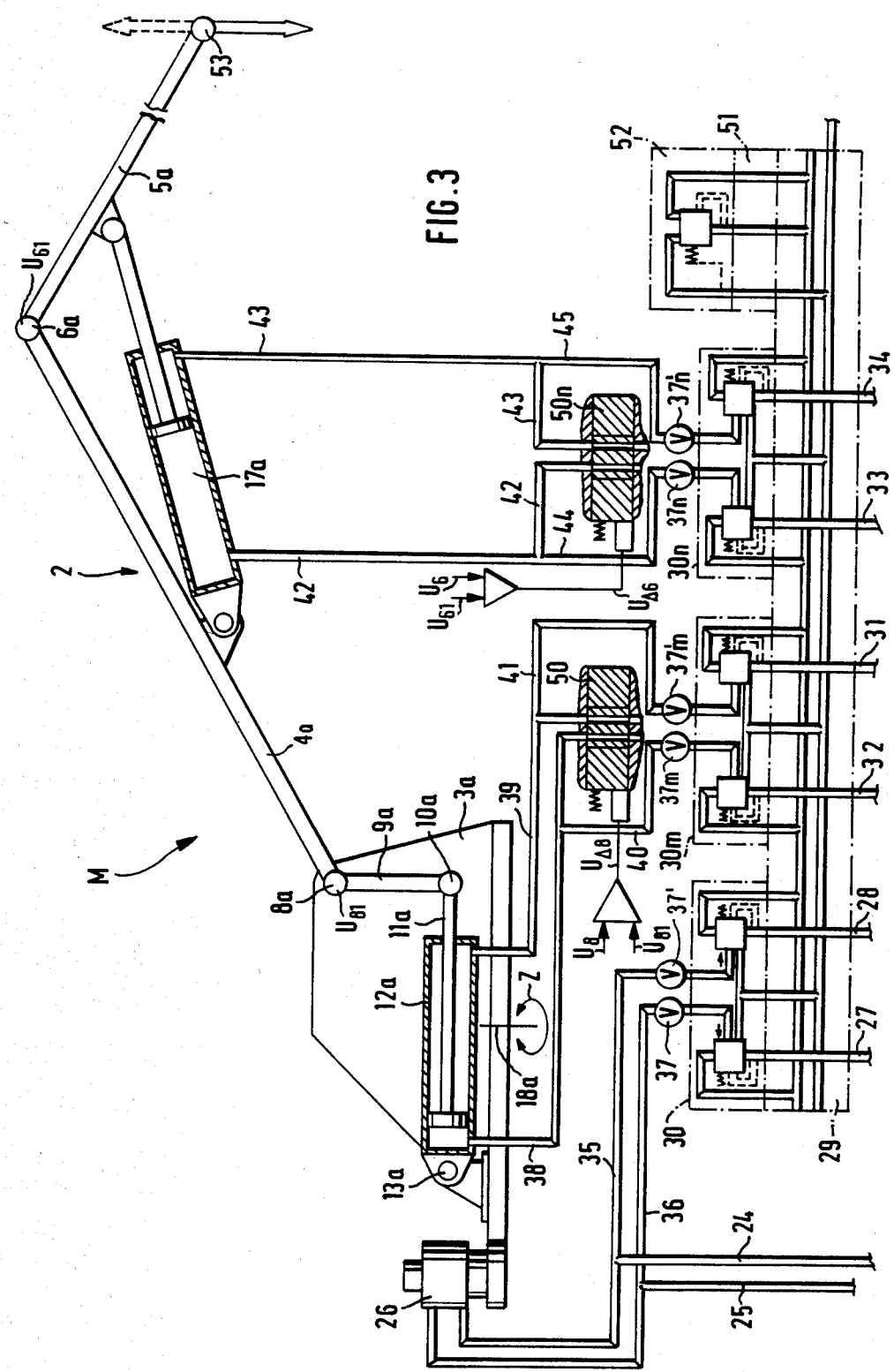

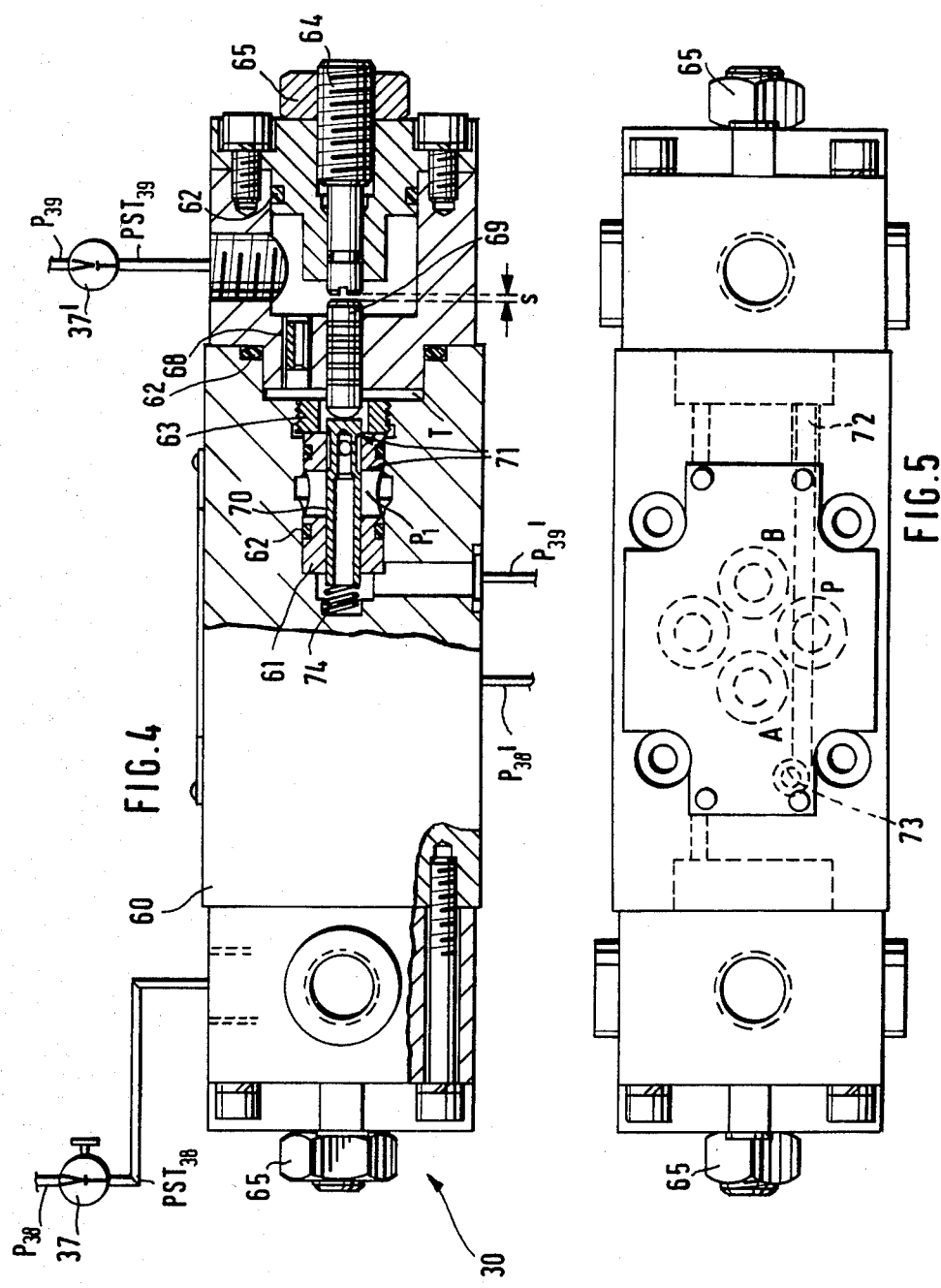

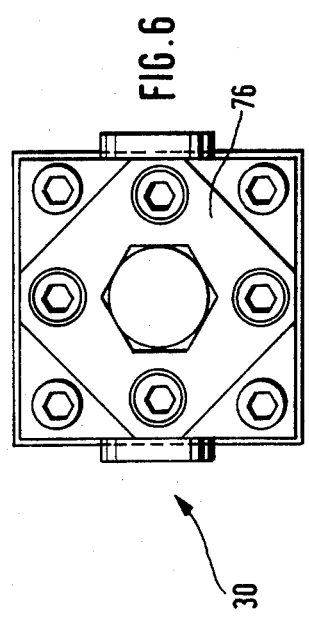
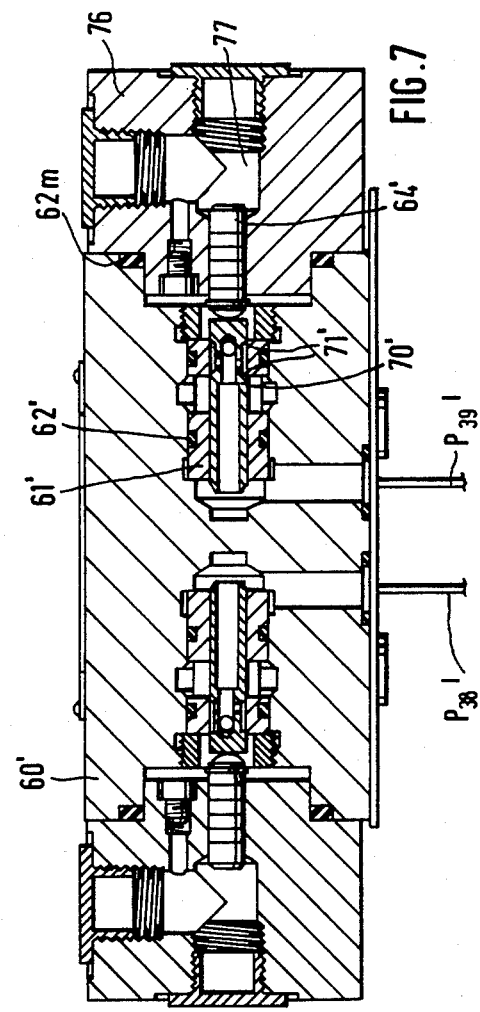

LOAD PRESSURE FEEDBACK SYSTEM HAVING AT LEAST ONE CONTROL VALVE FOR CONTROLLING AN APPARATUS

FIELD OF THE INVENTION

The invention relates to a load pressure feedback system having at least one control valve for controlling an apparatus, in particular a manipulator comprising a receiving member or load arm with an upper arm pivotally connected to a base portion or the like, and a lower arm pivoted to the upper arm, with a load receiving end, and, as a sensor member or control member, a manually movable control arm which is of the same configuration as but smaller than the load arm, wherein the hinges or pivot mountings of the receiving member or load arm and the sensor member or control arm are connected together.

PRIOR ART

U.S. Pat. No. 3,171,549 discloses a manipulator in the form of a mechanically operating manipulating apparatus wherein gripping jaws which are arranged on a movable carrier can grip a load and move it from one place to another.

SUMMARY OF THE INVENTION

In that connection, the operation of such manipulators, as in the operation of other pieces of equipment, has been found to be difficult, and the invention seeks to improve a mechanically operating manipulating apparatus rendering the control thereof sensitive, by a load pressure feedback system of the kind set forth above.

The solution to this problem provides that the valve has a hydraulic pilot control member, wherein the load pressures at the measuring locations of the apparatus are applied to the inlet of at least one throttle aperture, wherein the level of the control pressures is determined by the cross-sectional areas of the throttle aperture or a screw-in aperture means, and wherein at least one control piston is subjected on the one hand to the load pressures and on the other hand to the control pressures.

In accordance with further features of the invention, the hydraulic load pressure control valve which preferably has control edges is provided with apertures and the ratio of the cross-sectional areas thereof determines the control pressures.

A piston in the load pressure control valve has also been found advantageous, which is subjected to the output pressures and which co-operates with a control piston which in turn is subjected to secondary pressures.

In accordance with the invention, abutment members are provided to limit the maximum displacement of that control piston, wherein the control piston and the counteracting piston thereof can also be subjected to a spring loading.

According to the invention, associated with the load pressure control valve is at least one pressure reducing valve, and the valves are arranged on a plate. In addition, according to the invention, the cross-section of the throttle aperture is to be variable.

It is also in accordance with the present invention for the actual value generators at the pivots or rotary mountings of the control arm to be connected to reference value generators of the corresponding pivots or rotary mountings of the load arm by an electro-hydraulic positional control means which includes at least one hydraulic load pressure feedback member, preferably a load pressure control valve. In this arrangement, it has been found advantageous for at least a movement of the control arm, or the sensor member of the apparatus, to be controlled by mechanical means, and for the load force feedback system to be disposed in parallel therewith.

According to the invention, comparison of the reference value voltages with the actual value voltages results in differential voltages which cause deflection of the servo valves and thus the corresponding cantilever members. As soon as the actual value voltage corresponds to the reference value voltage and thus the differential signal disappears, the arrangement has reached the predetermined position and the cantilever members remain stationary. In comparison, the deflection of the rotary movement is taken off from the control arm directly mechanically by a copying valve or a corresponding member and, in accordance with the invention, the speed is determined by the magnitude of a deflection angle, with respect to a central position to which the arrangement is urged by force storage means.

In further accordance with the invention, the electro-hydraulic load force feedback system is in parallel with the mechanical positional control.

The base portion of the control arm is mounted rotatably on an axis which is connected to the hydraulic drive motor of the load arm by way of a miniature pivoting cylinder or a corresponding member and the load pressure control valve.

In this arrangement, the miniature cylinders or the like which are provided on the base of the sensor member or the control arm may also be connected by way of a load pressure control valve and a servo valve to a hydraulic cylinder of the load arm or receiving member.

A spreading cylinder is connected between the arm portions of the control arm or sensor member by way of a load pressure control valve, and a servo valve is connected to a corresponding spreading cylinder of the load arm or receiving member.

The construction in accordance with the invention of the load pressure control valve is described in greater detail hereinafter in the description of the drawing. In particular, the latter discloses essential features of the invention, which are not described in greater detail at this point, in order to avoid repetition.

BRIEF DESCRIPTION OF THE DRAWING

Further advantages, features and details of the invention will be apparent from the following description of preferred embodiments and with reference to the drawing in which:

FIG. 3 is a view corresponding to that shown in FIG. 1 of the load arm of the manipulator, with a diagrammatic view of an electro-hydraulic positional control system which includes load pressure control valves, FIG. 4 is a partly sectional side view of a load pressure control valve, FIG. 5 is a plan view of FIG. 4, FIG. 6 is an end view of the load pressure control valve, and FIG. 7 shows a further embodiment of a load pressure control valve.

DETAILED DESCRIPTION

Figure 1:
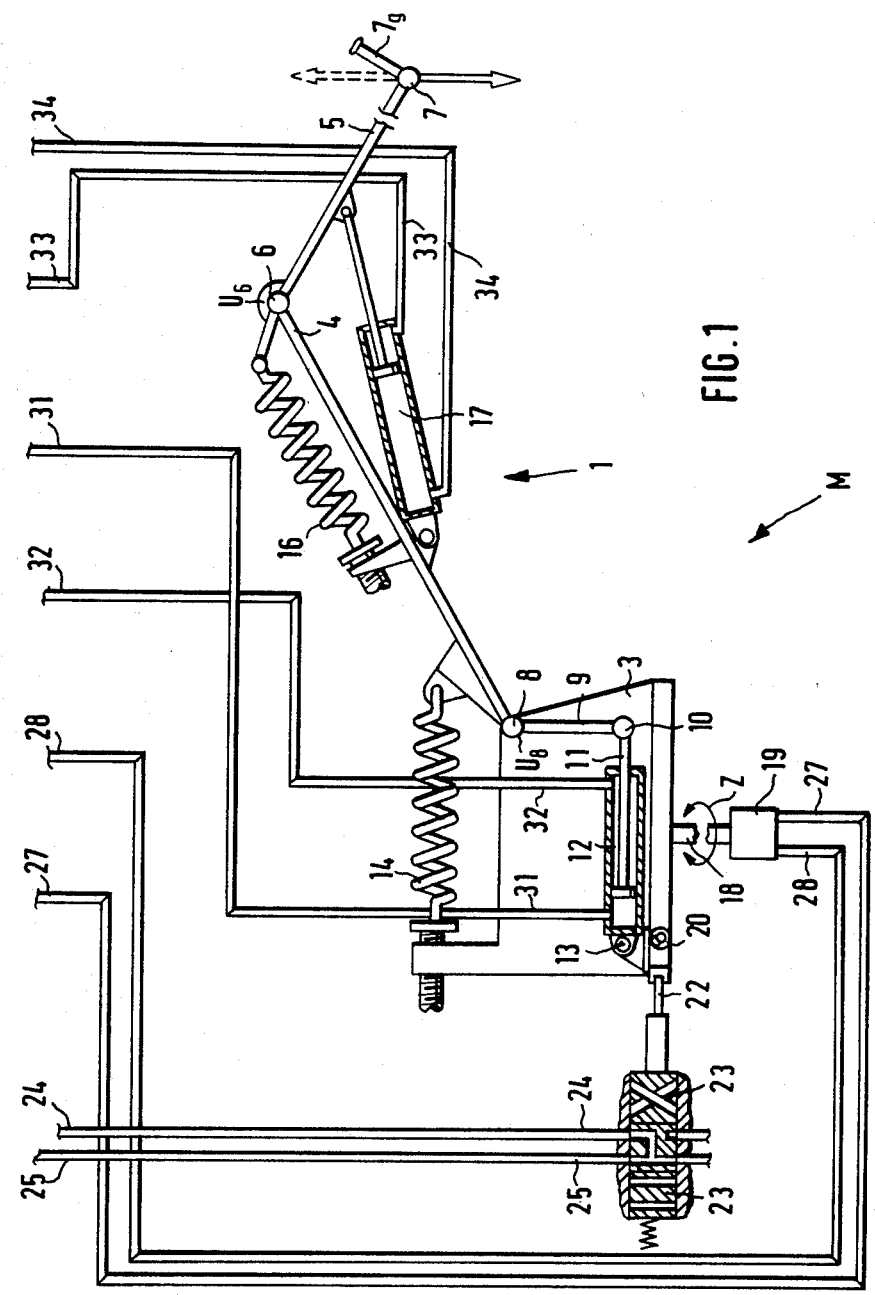
FIG. 1 is a diagrammatic side view of the control arm of a manipulator.

A manipulator M comprises a control arm 1 as shown in FIG. 1, which controls a load arm 2 as shown in FIG. 3, the load arm being connected to the control arm by way of an electro-hydraulic positional control means. The control arm 1 is substantially a copy on a smaller scale of the load arm 2.

From an inner base means 3 of the control arm 1 projects a model or pattern arm 4 with a model or pattern outer arm 5, with the arms being connected together by an (elbow) pivot or joint 6. Carried at the free end of the arm 5 is a (wrist) pivot or joint 7 for a control grip $7_g$.

The other end of the arm 4 is connected to an axis member 8 and is also rigidly connected to a lever arm 9 which is pivoted at 10 to a piston 11; the piston 11 is connected to a miniature cylinder 12 which in turn is mounted pivotally on the base means 3 at 13.

Disposed between the base means 3 and the arm 4 and between the arm 4 and the arm 5 are respective return springs 14 and 16 respectively. In addition, a spreading cylinder 17 is pivotally connected at both ends between the arm 4 and the arm 5.

Figure 2:
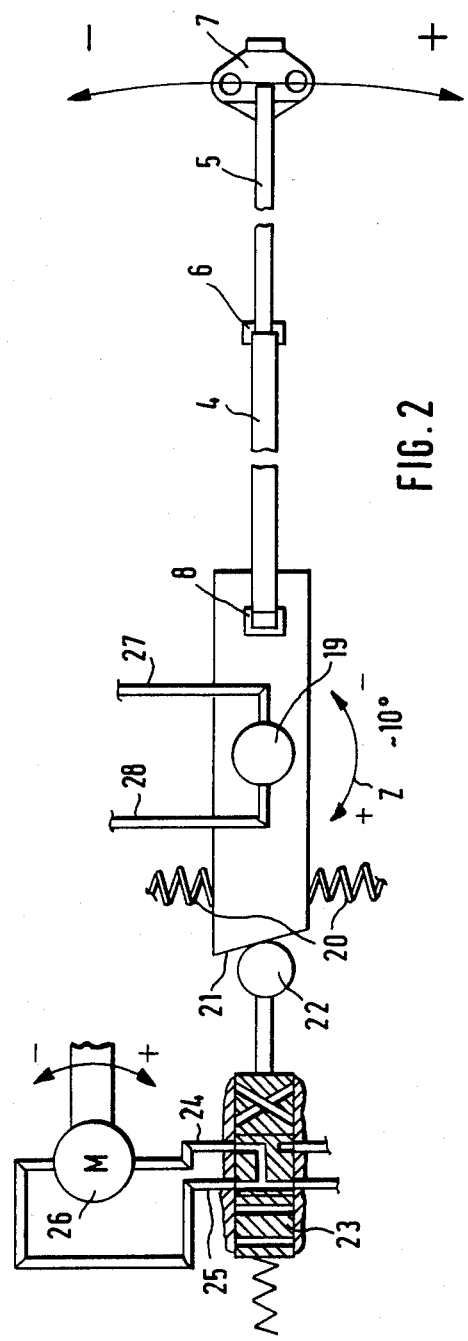
FIG. 2 is a plan view of the control arm.

The base means 3 is carried on the piston shaft 18 of a pivoting cylinder 19 and is pivotal in the direction indicated by the arrow z, through an angle of $\pm 10°$; centering springs 20 which horizontally engage the base means 3 on both sides thereof hold the base means 3 and thus the entire control arm 1 in the central position shown in FIG. 2. An inclined end surface 21 of the base means 3 is in contact, thereby acting as a control cam means, with a roller thrust rod 22 of a mechanical copying valve 23 which is connected by way of conduits 24 and 25 to a hydraulic drive motor 26.

Conduits 27 and 28 lead from the pivoting cylinder 19, by way of an interposed series plate 19, to a load pressure control valve 30.

Likewise, on the one hand the miniature cylinder 12 is connected to another load pressure control valve 30m by way of conduits 31 and 32, and on the other hand, the cylinder 17 between the arm 4 and the arm 5 is connected to another load pressure control valve 30n by way of conduits 33 and 34.

The load pressure control valve 30 is connected to the hydraulic drive motor 26 by conduits 35 and 36. Incorporated in the conduits 35 and 36 are adjustable throttle apertures 37, just as throttle apertures 37m, 37n are also associated with the other load pressure control valves 30m and 30n respectively, more particularly in connecting conduits 38, 39 and 40, 41 respectively to a hydraulic cylinder 12a and in connecting conduits 42,43 and 44,45 to a spreading cylinder 17a on the load arm 2. Insofar as the individual components of the load arm 2 correspond to those of the control arm 1, they are indicated by the respective reference numerals as used in FIG. 1, but with the addition of suffix 'a' (3a; 4a; 5a; 6a; 8a; 9a; 10a; 11a; 12a; 13a; 17a; 18a).

The load pressures are branched off by way of control conduits 40, 41 from the connecting conduits 38, 39 between the hydraulic cylinder 12a of the load arm and a servo valve 50, and fed to the load pressure control valve 30m. A corresponding arrangement is also provided in regard to the conduits 42, 43 between the spreading cylinder 17a and a servo valve 50n associated therewith, by means of control conduits 44, 45.

The load pressure control valves 30, 30m and 30n and a pressure reducing valve 52 with intermediate plate 51 are combined together on common series plate or control block 29.

For the purposes of controlling the manipulator, the reference value voltages $U_6$ and $U_8$ at the pivot locations 6 and 8 of the control arm 1 are compared to actual value voltages $U_{61}$ and $U_{81}$ at the corresponding pivot locations 6a and 8a of the load arm 2, to determine the differential voltages $U\Delta 6$ and $U\Delta 8$ which cause deflection of the servo valves 50 and thus the cantilever members 4a and 5a. As soon as the actual value voltage corresponds to the reference value voltage and thus the difference signal is zero, the arrangement has reached the position preset by the control arm 1, and the cantilever members 4a and 5a of the load arm 2 remain stationary.

In regard to rotary movement, the deflection of the copier valve 23 is produced directly mechanically. The direction of pivoting movement of the manipulator M is predetermined by the movement of the control grip $7_g$ towards the right or towards the left (+ or −), and the speed is predetermined by the magnitude of the deflection angle Z. As described, the arrangement is held in the central position by the centering springs 20 acting on the base means 3.

Operative in parallel with the above-described positional control system is a load force feedback or transmission system which transmits the pressure conditions in the working cylinders 12a, 17a and the drive motor 26 to the associated control members 12 (miniature cylinder), 17 (spreading cylinder) and 19 (pivoting cylinder).

The load pressures are applied to the load pressure control valves 30, 30m or 30n by way of the adjustable throttle apertures 37 37m or 37n; the load control valves control the output pressure proportionally to the corresponding input pressures.

The maximum pressure levels of the output pressures can be adjusted independently of each other by adjustment of the throttle apertures 37/37m/37n, whereby it is possible to adjust the feedback force to the control grip $7_g$.

If it is assumed that the output pressures are so adjusted that the control arm 1 is compensated in respect of forces, without a load, then a load at the load end 53 of the load arm 2 or an obstacle in the way of movement of the load arm 2 produce a corresponding counteracting force. This obviously also applies in regard to the acceleration or retardation forces.

The adjustable return springs 14 and 16 prevent the control arm 1 from sinking downwardly, when the system pressure is switched off.

The system pressure is reduced in the pressure reducing valve 52 to the admissible input pressure for the load pressure control valves 30, 30m and 30n respectively.

The load pressure control valves 30, 30m and 30n serve to provide a load or force feedback in respect of the desired movements, without technically expensive and complicated electronic pressure control circuits; they control the pressures in the corresponding control members of the control arm 1, proportionally to the prevailing load pressures at the control members, in a directly hydraulic mode.

The load pressure control valve 30 is described hereinafter with reference to FIGS. 4 to 6. In FIG. 4 there is shown in section the right side of valve 30 which controls the pressure between conduits 35 and 38, it being understood that a similar valve (not shown in FIG. 4.

but evident from FIG. 7) separately controls the pressure between conduits 36 and 27.

Disposed in a housing 60 is a control sleeve 61 with O-rings 62 as sealing means, and adjacent thereto a lock nut 63. An abutment member 64 projects towards the interior of the control sleeve 61, with the abutment member 64 also being sealed by means of O-rings and provided with an external nut 65.

The load pressure P38 and P39 respectively which prevail at the respective control members (hydraulic cylinder, hydraulic drive motor etc) of the manipulator M is applied to the inputs of respective ones of the adjustable throttle apertures 37 and 37' respectively as shown in FIG. 4. The control pressures PST38 and PST39 respectively result from the ratio of the cross-sectional areas of the throttle apertures 37 and 37' and screw-in control aperture members 68. As seen in FIG. 4, the downstream and of aperture member 68 communicates with a tank chamber T.

The control pressures PST38 and PST39 each act on a respective piston 69 which pistons 69 are in a condition of equilibrium with control pistons 70 which are subjected to the secondary pressures P38' and P39' respectively, at the opposite end.

If now, for example, because of a greater static or dynamic load on the load arm 2, the load pressure P39 and thus the control pressure PST39 rise, the equilibrium of forces on the control piston 70 is disturbed. Due to the increase of control pressure PST 39, the control piston 70 moves towards the left as viewed in FIG. 4, a control edge 71 is opened and the secondary output pressure P39' rises due to transmission of pump pressure in chamber $P_1$ through control piston 70. As soon as a condition of equilibrium of forces again prevails between the control piston 70 and the piston 69, the adjustment operation is terminated.

The maximum control range of the control pressures PST38 and PST39 respectively and thus the secondary output pressures P38 and P39 can be varied by adjusting the cross-section of the throttle apertures 37. In this way the force action on the control arm 1 and the load or force transmission ratio between the manipulator M and the control arm 1 can be adjusted.

The maximum deflection movement of the control pistons 70 can be limited and thus adjusted by means of the abutment members 64.

When the pump pressure ($P_1$) is switched off, springs 74 ensure that the control pistons 70 bear against the piston 69, and cause relief of the load on the system connected thereto.

In the embodment shown in FIG. 7, elements corresponding to those in FIG. 4 will be given the same reference character with a prime and not described in detail. As seen in FIG. 7, each abutment member 64' is disposed in a separate closure cover portion 76' which is mounted to the housing 60' by way of interposed O rings 62m. In this case, adjustment of the abutment member 64' is effected by pressure actuation, by way of pressure chambers 77.

In addition, reference letter s in FIG. 4 denotes a gap or clearance when the control piston 70 is in a central position, while numerals 75 and 76 in FIG. 7 denote a screw threaded pin and a closure screw member respectively.

I claim:

1. In a load pressure feedback system having at least one load pressure control valve for controlling a load arm in response to a control arm based on load pressures respectively in a first line connected to the load arm and a second line connected to the control arm, the improvement wherein said control valve comprises a housing having a first connection for a fluid at a pressure representative of the pressure in the load arm and a second connection for a fluid at a pressure representative of the pressure in the control arm, a throttle aperture in said line connected to the load arm, a screw-in aperture in said housing between the first and second connections, a first piston in said housing subject to the pressure at said first connection for undergoing displacement in response to varying pressures at said first connection, a control sleeve in said housing, and a control piston in said control sleeve forming control edges with said sleeve for balancing the pressures at said connections, said first piston and control piston being coaxially arranged in abutting relation under resilient action.

2. The improvement as claimed in claim 1 wherein said control edges are two in number and are spaced axially of said control piston in an arrangement in which with increasing pressure at said first connection said control piston is displaced from an initial equilibrium position to a new equilibrium position in which the pressure at said second connection is increased, the pressure established at said first connection being a function of the ratio of the cross-section of said throttle aperture and the screw-in aperture.

3. The improvement as claimed in claim 2 comprising means in said housing for applying the pressure at said first connection to the first piston and means for applying the pressure at said second connection to the control piston.

4. The improvement as claimed in claim 3 comprising stop means in said housing for limiting displacement of said first piston.

5. The improvement as claimed in claim 1 wherein said throttle aperture has a variable cross-section.

6. The improvement as claimed in claim 1 comprising at least one pressure reduction valve associated with the control valve, and a plate for said valves.

7. The improvement as claimed in claim 1 comprising actual-value transmitters on joints of the control arm, desired-value transmitters at corresponding joints of the load arm and electrohydraulic position regulation means connecting said transmitters and including at least one of said control valves as load-pressure sensing member.

8. The improvement as claimed in claim 1 wherein said throttle aperture is outside said housing.

9. The improvement as claimed in claim 1 wherein said housing has a first chamber into which one end of said first piston extends, said first chamber being subject to the pressure downstream of said throttle aperture.

10. The improvement as claimed in claim 9 wherein said housing has a second chamber which is connected to the first chamber via said screw-in aperture whereby the pressure in the first chamber is controlled by the throttle aperture and the screw-in aperture and the second chamber is subject to the pressure downstream of the screw-in aperture.

* * * * *